United States Patent [19]

Cottis et al.

[11] Patent Number: 5,356,992
[45] Date of Patent: Oct. 18, 1994

[54] COMPATIBILIZED BLENDS OF PPE/POLYETHYLENE COPOLYMER

[75] Inventors: Steve G. Cottis, Hightstown; Kavilipalayam M. Natarajan, North Brunswick, both of N.J.

[73] Assignee: Enichem S.p.A., Milan, Italy

[21] Appl. No.: 23,914

[22] Filed: Feb. 26, 1993

Related U.S. Application Data

[63] and a continuation-in-part of Ser. No. 898,829, Jun. 15, 1992, Pat. No. 5,286,793.

[51] Int. Cl.$^5$ .................. C08L 33/02; C08L 71/12
[52] U.S. Cl. ...................... 525/68; 525/92; 525/132; 525/397; 525/905
[58] Field of Search ............... 525/68, 132, 397, 905, 525/92

[56] References Cited

U.S. PATENT DOCUMENTS

| | | | |
|---|---|---|---|
| 3,375,228 | 3/1968 | Holoch et al. | 525/390 |
| 4,048,143 | 9/1977 | Hay et al. | 525/397 |
| 4,165,422 | 8/1979 | White | 525/397 |
| 4,391,950 | 7/1983 | Cooper | 525/132 |
| 4,460,743 | 7/1984 | Abe et al. | 525/68 |
| 4,590,241 | 5/1986 | Hohlfeld | 525/132 |
| 4,728,461 | 3/1988 | Fujii et al. | 525/68 |
| 4,806,602 | 2/1989 | White et al. | 525/397 |
| 4,871,800 | 10/1989 | Fujii et al. | 525/68 |
| 4,914,153 | 4/1990 | Togo et al. | 525/68 |

FOREIGN PATENT DOCUMENTS

| | | |
|---|---|---|
| 57-168938 | 10/1982 | Japan. |
| 63-108046 | 5/1988 | Japan. |
| 63-122755 | 5/1988 | Japan. |

OTHER PUBLICATIONS

Lenz, Robert W. "Organic Chemistry of Synthetic High Polymers," Interscience Publishers, New York. (1967). p. 85.

Polymer Engineering and Science, (1992) 32:1876–1885, "Properties of a Thermotropic Liquid Crystalline Polymer Blended with Different Thermoplastics", Chapleau et al.

*Primary Examiner*—James J. Seidleck
*Assistant Examiner*—Thomas Hamilton, III
*Attorney, Agent, or Firm*—Oblon, Spivak, McClelland, Maier & Neustadt

[57] ABSTRACT

Polymer compositions containing a polyphenylene etherpolyolefin copolymer are obtained by reactive melt mixing olefin-(alkyl)acrylic acid copolymer with a polyphenylene ether and a carboxylic anhydride. The compositions are used in many commercial applications requiring high temperature resistance including formation of films, fibers and molded articles with excellent surface appearance.

16 Claims, No Drawings

COMPATIBILIZED BLENDS OF PPE/POLYETHYLENE COPOLYMER

RELATED APPLICATION

This application is a continuation-in-part of application Ser. no. 07/898,829 filed Jun. 15, 1992 now U.S. Pat. No. 286,793.

BACKGROUND OF THE INVENTION

1. Field of the Invention

The present invention is directed to novel polyphenylene ether-polyethylene copolymer blends prepared by reactive melt blending of polyphenylene ether or an ester end-capped polyphenylene ether with an ethylene-acrylic acid copolymer.

2. Discussion of the Background

The polyphenylene ether resins (PPE) constitute a family of high performance engineering thermoplastics possessing outstanding properties, such as relatively high melt viscosities and softening points, which make them useful for many commercial applications. More precisely, PPE resins are suitable for many commercial applications requiring high temperature resistance and including formation of films and molded articles.

Among the most important characteristics of PPE resins are excellent hydrolyric stability, dimensional stability, toughness, heat resistance and dielectric properties.

On the other hand, PPE resins, although displaying the above-mentioned desirable properties, are also endowed with certain unsatisfactory properties which render them undesirable for many commercial uses. For example, films and fibers can be formed from polyphenylene ether resins on a commercial scale using solution techniques but melt processing is commercially limited because of the high temperatures required to soften the PPE resins which cause instability and changes in the polymer structure. Further, PPE polymers tend to degrade and to grow dark during melt processing.

Moreover, PPE resins are brittle due to their poor impact strength and limited in tensile properties and they are endowed with poor solvent resistance as well, and therefore cannot be used in applications, such as automotive applications where the parts will be exposed to chemicals, such as gasoline, grease and detergents. Therefore, there is a continuing search for improving the deficient characteristics of PPE particularly workability and solvent resistance.

In order to improve molding properties and impact strength, polyblends of polyphenylene ether resins with styrene resins have been employed. Thus U.S. Pat. No. 3,363,435 discloses that PPE can be mixed with polystyrene (PS) in all proportions to give blends with a good combination of properties and enhanced molding properties. However, the range of application of PPE-PS blends is still limited due to poor solvent resistance, i.e., they are unsuitable in fields requiring resistance to oils and gasoline.

In order to overcome the poor solvent resistance of PPE a number of blend compositions of polyolefins and PPE have been proposed. For instance U.S. Pat. No. 3,361,851 reported blends of PPE with small quantities (up to ten percent) of polyethylene (PE) which result in some improvements in both the impact strength and solvent resistance of PPE.

Other PPE-PE blends displaying a better set of properties with reference to PPE resins alone have been disclosed in U.S. Pat. No. 4,166,055, Japanese Patent Publication No. 7069/67, Japanese Patent Application Nos. 71,158/78 and 88,960/79.

It has been shown that polyolefins, particularly polyethylene (PE), even when added in small amounts, can noticeably change some characteristics of the PPE and therefore constitute an excellent component at very low price in the binary blends with PPE and in ternary blends with PPE and PS resins. Preferred amounts of PE in such blends range from 1 to 10% by weight (U.S. Pat. No. 3,361,851; U.S. Pat. No. 4,584,334), and are sufficient to improve their impact and cracking resistance.

Moreover PE acts as a plasticizer for PPE and the resulting blends are endowed with enhanced workability and better surface appearance (U.S. Pat. No. 3,809,729; DE 57,139,140; U.S. Pat. No. 4,145,377; U.S. Pat. No. 4,584,334).

Among other properties which are improved by adding small amounts of PE, the most important is the oxidation resistance of the melted PPE blends. PPE resins containing small amounts of polyethylene do not grow dark during melt processing.

Nevertheless, PPE-PE blends fail to take full advantage of organic solvent resistance inherent in polyolefins because either the amount of the polyolefin is too small or PPE and PE resins are not very compatible at higher compounding ratios exceeding 3-5% by weight of PE. The same incompatibility has been observed in PPE blends with high molecular weight polyolefins. In compositions composed of polyphenylene ether and either high molecular weight polyolefin or polyolefin exceeding 3-5% by weight, the two polymers are not uniformly mixed with each other and form a "sea-island" structure according to U.S. Pat. No. 4,460,743. Consequently, the resulting composition is fragile and has reduced mechanical strength and impact strength. When injection molded, the two polymers tend to agglomerate in the direction of the resin stream due to their essentially poor compatibility with each other and the resulting moldings are delaminated in a laminar state, thus being unsuitable for practical use. The use of lower molecular weight polyolefins do not solve the problem of the incompatibility either.

One way to overcome these drawbacks and increase the amount of compatible PE in PPE-PE blends is to add styrene (co)polymers or block copolymers of styrene and a conjugated diene as compatibilizers of the same blends. In the Japanese Patent Application No. 76547/85 it has been asserted that using a styrene-butadiene block-copolymer as a compatibilizer, the compatibility between PPE and PE resins can be improved up to 20% by weight of PE. Similar results have been disclosed in Japanese Patent Applications Nos. 71158/78, 88960/79 and 100159/84.

Although these compositions show improvements in molding properties, they fail to take advantage of the organic solvent resistance inherent to polyolefins from the point of view that the compounding ratio of the polyolefin in the composition is still too small or that the continuous phase is PPE or PPE-PS. Moreover, blends of PPE with block-copolymers of styrene have limitations to their use due to their inferior stiffness and tend to exhibit delamination (U.S. Pat. No. 4,322,507).

A second and probably preferred method of compatibilization of PPE with PE, is the use of PPE-PE copolymers. When present in the blend, these copolymers serve as compatibilizers for the uncopolymerized constituents, namely PPE and PE (U.S. Pat. No. 5,010,144; U.S. Pat. No. 4,460,743). Moreover, it has been shown that PPE-PE (grafted) copolymers can be compounded with styrene resins and give rise to perfectly compatible compositions (U.S. Pat. No. 4,460,743).

Several ways to obtain copolymers (or grafted copolyymers) of PPE with PE have been so far proposed. In U.S. Pat. No. 4,460,743 a polyphenylene ether-grafted polyolefin has been disclosed which has been obtained by reacting a glycidylated PPE with a polyolefin having anhydride groups or conversely by reacting a polyphenylene ether having anhydride groups with a glycidylated polyolefin. In U.S. Patent Application No. 07/351,905 PPE-PE copolymers have been obtained by reaction of a functionalized olefin polymer with a PPE which has been previously capped with an epoxychlorotriazine. A similar method giving the same copolymers is described in U.S. 5,010,144.

An even more complicated way to obtain PPE-PE copolymers or grafted copolymers has been disclosed in U.S. 4,914,153. According to this patent PPE-PE graft copolymers are obtained "in situ" by melt-kneading a modified (with maleic anhydride) polyphenylene ether with modified (with maleic anhydride) polyolefin and in the presence of a binder such as phenylenediamine.

It is apparent that all the proposed methods of compatibilizing PPE with PE resins are more or less complicated and expensive.

Therefore the problem of obtaining stable and compatible PPE compositions endowed with better processability and impact properties together with outstanding solvent resistance still exists.

Furthermore, the problem still exists of obtaining PPE resins containing PE polymers in such amounts as to display superior properties without any loss of compatibility between the components and still more without the need of adding considerable amount of compatibilizers such as styrene (co)polymers or blockpolymers.

SUMMARY OF THE INVENTION

One object of the present invention is, therefore, to solve these problems and to provide PPE compositions having excellent processability together with outstanding solvent resistance and melt stability without any loss in the compatibility of their components.

Another object is to provide PPE compositions which do not undergo the observed catastrophic delaminations and reductions in mechanical strength when undergoing shear stress upon molding or other melt mixings.

A further object of the present invention is to provide a fast process for obtaining said PPE compositions.

This and other objects which will become apparent from the specification have been achieved by the present polyphenylene ether compositions which contains an in situ formed polyphenylene ether-polyethylene/acrylic acid (EAA) graft copolymer (PPE-gPE) blend.

DETAILED DESCRIPTION OF THE PREFERRED EMBODIMENTS

The compatible PPE/EAA copolymer blend of the present invention, obtained by the reactive melt mixing of the nwo polymers (A) and (B), may be made from only the two starting polymeric components, or the blend may be present together with other polymers.

The most suitable additional polymers are styrenic polymers, e.g. polystyrene or the styrene copolymers of Japanese Application No. 76547/85, whose compatibility with the PPE components of the blend of the present invention is excellent. Other polymers, such as PPE, PE or EAA may also be part of the blends. When PPE, PE or EAA are present together in the blends their compatibility is improved by the presence of the PPE/EAA blend of the present invention.

The in situ formed copolymer blends of the present invention, in addition to their use as thermoplastic resins endowed with high temperature resistance together with excellent solvent resistance, may be used as compatibilizers in the formation of blends with other polymers.

The blends of the present invention can be used in many commercial applications requiring high temperature resistance, including formation of films, fibers and molded articles with excellent surface appearance. The molded products range from parts and housings for household appliances to internal and external decorative parts of automobiles, including components for automobiles, body panels, parts and housings of electrical and electronic products. More generally the compositions of the present invention can be used in every engineering plastic application where a good balance between impact and heat resistance, excellent appearance and moldability are required.

According to the present invention, there are provided compositions comprising thermoplastic resins derived from the reactive melt mixing of a two polymer mixture of:

A) 40 to 80%, preferably about 50–70%, by weight of a PPE or ester end-capped PPE, and B) 20 to 60%, preferably about 30–50% by weigh of an ethylene-acrylic acid random copolymer containing from 0.1 to 5 mol percent acrylic acid.

C) 0.1–3.0 wt. %, based on the sum of A) and B), of a carboxylic anhydride.

The compositions of the present invention are obtained as follows. The PPE or ester end-capped PPE and the ethylene-acrylic acid copolymer in the required compounding ratio, i.e., in a ratio A/B of from 40/60 to 80/20 by weight, preferably 50/50 to 70/30, are reactive melt blended with the carboxylic anhydride C in a mixer (e.g. in a HAAKE-BUCHLER mixer) at a suitable temperature high enough to melt all the components and preferably in the range 260°–310 ° C.

Polymer (A) has the structure —[X]—$_p$OH or —[X-]—$_p$O—$_p$O—C(O)—Y where Y is an alkyl, aryl, or aralkyl group, p is the total number of monomer units and is 20 or more, and X has the following structure.

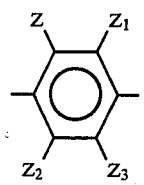

wherein the substituents $Z_1$, $Z_2$, $Z_3$ and $Z_4$ have the meanings given below. Copolymer (B) has the structure

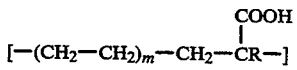

wherein R is hydrogen or alkyl of from 1 to 4 carbon atoms, preferably methyl, m is the number of ethylene monomer units per acrylic acid unit in the random copolymer (B) and is preferably an integer number from 20 to 1000.

PPE and ester end-capped PPE are well known reactive polymers. End-capped PPE is described in U.S. Pat. Nos. 4,806,602, 4,048,143 and 3,375,228 and is generally prepared by reaction of a polyphenylene ether with at least one carboxylic acid anhydride in the presence of a catalyst and at a temperature in the range of approximately 170°–300° C. U.S. Pat. Nos. 4,806,602, 4,048,143 and 3,375,228 are incorporated herein by reference in their entirety for a more complete description of the ester end-capped PPE which can be used in the present invention. Benzoate end-capped PPE is particularly preferred.

The benzoate end-capped PPE of the present invention can be readily prepared by reacting the terminal hydroxyl (OH) groups of PPE with benzoyl chloride in chloroform followed by precipitation of the end-capped polymer with methanol addition. Typically benzoate end-capped PPE has 30–70% of the available hydroxyl (OH) groups end-capped as benzoate groups (U.S. Pat. No. 4,822,836). A suitable process for preparing the benzoate end-capped polyphenylene ether of the present invention is described, for example, in U.S. Pat. No. 4,822,836 which is incorporated herein by reference for a more complete description of a method of preparing the benzoate end-capped PPE.

Polyphenylene ether resins are well known polymers. They are generally obtained via oxidative coupling of one or more and different phenols and in presence of suitable catalysts. The preferred polyphenylene ethers (PPE) have the formula

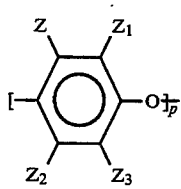

where $Z$, $Z_1$, $Z_2$ and $Z_3$, which may be the same or different, are monovalent substituents, independently selected from the group of hydrogen, halogen (Cl, Br, I, F), hydrocarbon groups containing from 1 to 4 carbon atoms, and phenyl; p is the total number of monomer units and is a positive integer of 20 or more. Preferably, the substituents $Z$, $Z_1$, $Z_2$ and $Z_3$ are $C_{1-6}$alkyl groups. The ether oxygen atom per unit is connected to the phenyl ring of the next monomer unit.

Typical examples of suitable polyphenylene ethers are:
- poly (2,6 -dimethyl- 1,4 -phenylene) ether;
- poly (2,6-diethyl-1,4-phenylene) ether;
- poly (2 -methyl - 6 -ethyl -1,4 -phenyl ene) ether;
- poly (2 -methyl -6 -propyl-1,4-phenylene) ether;
- poly) 2,6-dipropyl-1,4-phenylene) ether;
- poly(2,3,6-trimethyl-i, 4-phenylene) ether;
- poly ( 2 -chloro-1,4 -phenylene) ether;
- poly (2-bromo-1,4-phenylene) ether;
- poly ( 2 -phenyl - 1,4 -phenylene ) ether; and
- poly(2,6-dichloro-1,4-phenylene) ether.

Preferably, poly(2,6-dimethyl-l,4-phenylene)ether is used. Copolymers, such as a 2,6-dimethylphenol/2,3,6-trimethylphenol copolymers can also be used.

Processes for producing these polyphenylene ethers are known and described for example in U.S. Pat. No. 3,306,874; U.S. Pat. No. 3,306,875; U.S. Pat. No. 3,257,357; U.S. Pat. No. 3,257,358. These U.S. Pat. Nos. are incorporated herein by reference for a more complete description of suitable PPE which can be used in the present invention.

Moreover, the PPE resins which can be used in the present invention, include polymers having monomer units of the formula

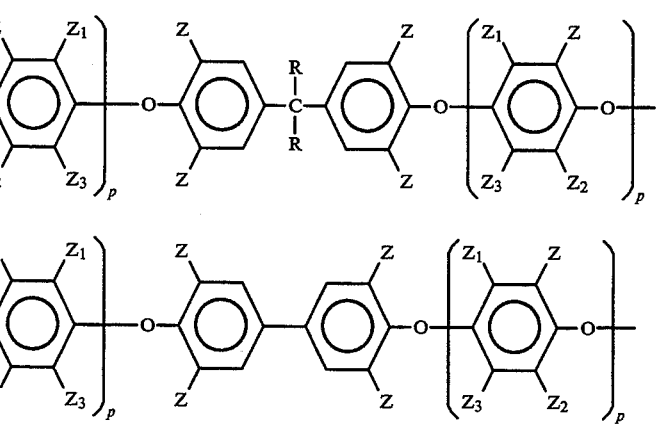

where $Z$, $Z_1$, $Z_2$, $Z_3$, R and p have the meanings given above and Q, which is the same or different from p, represents the total number of the monomer units in the brackets and is a positive integer of 20 or more. These PPE resins are described, for example, in "Die Makromolekulare Chemie, 186, 1835–1853, (1985). The most frequently used PPE resin among those corresponding to the structural formulas shown above, is the copolymer obtained by reacting tetramethylbisphenol-A with 2,6-dimethyl-phenol.

Preferred polyphenylene ethers have a weight average molecular weight ranging from 10,000 to 100,000. Preferred molecular weights are within the range of 30,000–60,000.

Polyolefin ($C_{2-4}$)-(alkyl)acrylic acid random copolymers, such as ethylene-(alkyl)acrylic acid polymers (EAA), are well known polymers and are generally obtained via radical polymerization. Patents describing their synthesis, include DE 1,570,560; DE 1,570,612 and U.S. Pat. No. 4,988,781. U.S. Pat. No. 4,988,781 is incorporated herein by reference for a more complete description of ethylene-(alkyl)acrylic acid copolymers which can be used in the present invention. The most preferred ethylene-(alkyl)acrylic acid copolymers have an (alkyl)acrylic acid content of from about 4 wt. % to about 15 wt. %, more preferably about 5–10 wt. % relative to the EAA and have a weight average molecular weight in the range of about 100,000 or more, preferably about 100,000–1,000,000. If the acid content of the polyolefin-(alkyl)acrylic acid random copolymer is above about 15 wt. %, crosslinking of the random copolymer occurs which decreases the ability of the copolymer to be compatibilized with the PPE.

The melt index of the EAA copolymers is preferably 10 g/10 min or less at 190° C., more preferably 5 g/10 min or less (ASTM D-1238). Preferred ethylene-(alkyl)acrylic acid copolymers are prepared from ethylene and $C_{1-6}$ alkyl acrylic acid monomers, preferably acrylic acid and/or methacrylic acid. A particularly preferred ethylene/acrylic acid is made by Dow Chemical Co. and is commercialized under the tradename of PRIMACOR.

The most important characteristics of Primacor copolymers are shown below. Any of these copolymers may be used in the present invention.

| Physical Properties of Select PRIMACOR Polymers for Film Extrusion | | | | |
| --- | --- | --- | --- | --- |
| | PRIMACOR 1320 | PRIMACOR 1410-XT | PRIMACOR 1420 | PRIMACOR 1430 |
| Wt % comonomer (ASTM D-4094) | 6.5 | 9.5 | 9.5 | 9.5 |
| Melt index, d-g/min. (ASTM D-1238) | 2.5 | 1.5 | 3.0 | 5.0 |
| Density, g/cc | 0.932 | 0.938 | 0.938 | 0.938 |
| Vicat softening pt, °C. (°F.) (ASTM D-1525) | 85(185) | 81(178) | 78(172) | 78(172) |
| Tensile strength, psi (ASTM D-638) | 1200 | 1210 | 1385 | 1170 |
| Ultimate tensile strength (ASTM D-638) | 2825 | 3400 | 3580 | 3000 |
| Ultimate elongation, % (ASTM D-638) | 620 | 585 | 510 | 545 |

Preferred EAA copolymers, suitable for the present invention are the ones having a low residual acid monomer content. Residual acid monomers present in the copolymer may react with the carboxylic anhydride reducing the effective amount thereof present in the mixture, thereby interfering with the dispersion of PPE in the higher viscosity EAA matrix. Preferably, the EAA copolymer should have a residual acid monomer content less than 1 wt %, more preferably less than 0.5 wt % to minimize size reactions of the carboxylic anhydride with the acid monomer.

The carboxylic anhydrides (C) suitable for the objects of the present invention are organic compounds having in their molecular structure one or more functional group —CO—O—CO—.

Preferred carboxylic anhydrides are $C_{9-20}$ aromatic $C_{4-20}$ aliphatic and cycloaliphatic, and mixed aromatic/aliphatic or cycloaliphatic anhydrides in which one half of the anhydride is aromatic and the other half of the anhydride is aliphatic or cycloaliphatic. Suitable examples include benzoic anhydride, toluic anhydride and 2-naphthoic anhydride.

The carboxylic anhydride should preferably have a boiling point above the temperature of the reactive melt mixing step to prevent volatilization of the carboxylic anhydride prior to reaction. The acid side product should be sufficiently volatile to be driven from the melt, driving the reaction toward completion.

A particularly preferred anhydride is benzoic anhydride.

The relative amounts of polymer (A) and polymer (B) (PPE/EAA) which are melt blended to form polymer blend of the present invention are in the range from 40:60 to 80:20. When melt blending the ester endcapped PPE with EAA, it is preferable to select the amount of EAA such that an excess molar amount of acrylic acid units is present relative to the ester endcapped units. Preferably the relative amounts of polymers (A) and (B) are in the respective range of from 50:50 to 70:30.

The carboxylic anhydride (C) is added to the PPE and EAA in an amount ranging from about 0.1–3.0 wt. %, preferably about 1–2.5 wt. %, more preferably about 1–1.5 wt. % based on the total weight of PPE and EAA polymers.

In the course of the melt blending of the components (A), (B) and (C), a reaction between the carboxylic anhydride (C) and the ethylene-(alkyl)acrylic acid copolymer (B) supposedly takes place. Such reaction is fast and exothermic and occurs at relatively low temperatures. The reaction occurs quickly even at temperatures as low as 150°–175 C. The reaction is not limited by temperature for practical application, rather is limited only by the time required to adequately mix the initial components. The extruder process can be conducted using conventional extruders and extrusion conditions well known to those in the art.

In a typical embodiment of the present invention, after mixing the PPE and EAA with carboxylic anhydride in a melt mixer, preheated to 270° C., the reaction temperature begins to rise rapidly from the complete addition of the reactants. Temperatures of 270° C. and higher are reached after only about 1 minute of mixing. The torque measured during mixing also rises rapidly within the first 1–3 minutes before leveling off. In contrast, melt mixing PPE and EAA without the presence of carboxylic anhydride requires substantially longer times to reach 270° C. (about 4 minutes). The reaction between PPE and EAA in the presence of carboxylic anhydride is sufficiently fast to allow the reaction to be conducted in a conventional extruder having a residence time of about 0.5–2 minutes. This processing advantage is significant since it allows continuous processing and extruding of the polymer blend as it is formed.

The carboxylic anhydride is also believed to provide in situ end-capping of the PPE concurrent with anhydride bond formation in the EAA and the covalent bonding between the PPE and EAA. For example, in a polymer blend prepared using benzoic anhydride, an infrared (IR) spectra of a chloroform extract of the blend of the invention indicates a benzoate ester carbonyl band at 1742 $cm^{-1}$. SEM photomicrographs of a pressed film of the reaction product show a sub-micron dispersion of PPE in the EAA matrix.

Blends obtained by reaction with carboxylic anhydride retain their thermoplastic behavior and can be compression and injection molded. The blends have a lighter color than compatible PPE/EAA blends prepared without using carboxylic anhydride. The mechanical properties of blends prepared in an extruder are also better than equivalent blends made thermally in a HAAKE mixer. The flexural modulus of PPE/EAA (70 wt %/30 wt %) blends made with benzoic anhydride in an extruder is, for example, 155,000–160,000 psi. The tensile strength is about 6,000 psi and the notched IZOD value is about 1.0 ft - lbs. Solvent resistance of these blends is also good.

Reactive melt mixing of PPE with EAA in the presence of carboxylic anhydride may also be conducted using a catalyst.

The use of a catalyst reduces the average particle size of the PPE particles which are dispersed in the EAA from several microns in diameter to about 0.5–2 microns in diameter, preferably 0.5–1 microns in diameter. Further, use of a catalyst produces higher torque values during melt mixing. Higher torque values indicate the formation of higher molecular weight compounds and increases in viscosity which are associated with improved compatibility and solvent resistance.

As a catalyst, any compound which catalyzes esterification reactions between the OH end-groups of uncapped PPE or the ester groups of the end-capped PPE with the COOH groups of EAA may be used. Examples of suitable known catalysts include metal salts, such as sulfates, titanares, stanates, etc., as well as metal salts of organic carboxylic acids, i.e., $C_{1-10}$ alkanoic acids. Metal salts containing alkali and alkaline earth metal cations are preferred.

The metal salts may be used as the anhydrous salt or, alternatively, may be hydrated. A particularly preferred catalyst is magnesium acetate tetrahydrate. However, hydrated catalysts may partially inhibit the effect of the carboxylic anhydride (C). Water liberated from the hydrate catalyst hydrolyzes the carboxylic anhydride reducing the effective concentration of anhydride present during the reaction. Melt mixing processes conducted using hydrated catalysts must, therefore, be conducted using a proportionately greater amount of anhydride to maintain the desired anhydride concentration after hydrolysis due to the water of hydration in the catalyst.

Additional catalysts which are suitable for use in the present invention are described in GB 2,150,580.

According to the present invention, the fast reactions occurring when PPE and EAA are mold blended in the presence of a carboxylic anhydride enable one to directly prepare the compatible blends in an extruder without the need for separane reactive melt mixing and extruding steps. Reactions in an extruder are generally conducted at temperatures of about 260°–310° C., preferably at 270°–295° C. At temperatures substantially lower than 260° C., the PPE becomes too viscous and is not adequately dispersed in the EAA matrix. Blending is accomplished with the benefit of the pressure at the die of the extruder. Compatible polymer blends are produced even though the residence time in the extruder is relatively short, i.e., about 0.5–2 minutes. Low pressure vacuum zones in the extruder allow one to remove unreacted monomer and volatile side products.

While not being bound by any particular theory, it is believed that the carboxylic anhydride reacts rapidly with the acid groups on the EAA to give a mixed anhydride, forming a free carboxylic acid as a by-product. As the reaction continues, the mixed anhydride then reacts with additional acid groups from the acrylic acid portion of the EAA to give the EAA dianhydride and liberate additional benzoic acid. Formation of the dianhydride produces the rapid increase in melt viscocity which allows dispersion of PPE as small droplets and compatiblization.

Thus, the compatibilization appears to result from a combination of events. Reaction of EAA with carboxylic anhydride produces an extremely rapid increase in viscosity of the EAA. This rapid increase in viscosity occurs by formation of dianhydrides of EAA. The PPE becomes dispersed as small droplets in this viscous EAA matrix. Dispersion of the PPE in the EAA results in compatibilization. This compatibilized morphology is then fixed by the reaction of a portion of the end groups (OH or ester) of the PPE with the anhydride bonds of the EAA anhydride.

Some or all of the EAA may be replaced with a different polymer, preferably a polyolefin, containing carboxylic acid or acid anhydride groups. Preferred polymers are maleated polyolefins (POLYBOND 3009) and acid-functionalized polyolefins obtained from commercially available maleated polyolefins. Suitable examples include maleated ethylene-propylene-diene polymers (EPDM), maleated polyethylene and maleated polypropylene containing about 0.25 wt. % maleic anhydride monomer units. For example, a portion of the EAA may be replaced with maleated polyethylene, preferably high density polyethylene (HDPE), or a derivative thereof having a free carboxylic acid group. Preferred derivatized polymers are polymers prepared by reacting a maleated polyolefin with an amino group-containing carboxylic acid compound. The amino group reacts with maleic anhydride monomer units to produce maleimido monomer units having a free carboxylic acid functionality. Suitable amino carboxylic acid compounds include $C_{3-30}$ alkanoic acids substituted with an amino group. Preferably, the alkanoic acid is amino substituted on the omega-terminal carbon atom. Preferred amino carboxylic acids have the formula $NH_2(CH_2)_n$-COOH, where n=3–30, preferably 4–28. Aromatic amino carboxylic acids may also be used to derivatize the maleated polyolefin. Suitable aromatic amino carboxylic acid compounds contain 7–20 carbon atoms, preferrably 7–11 carbon atoms, and include, for example, p-aminobenzoic acid, m-aminobenzoic acid and aminonaphthoic acids. Maleated HDPE can be reacted with p-aminobenzoic acid (PABA), for example, to produce p-maleimidobenzoic acid units. Both the maleated polyolefins and the maleimido derivatives thereof described above can be extruded with PPE in the presence of anhydride to form compatible polymer blends. For example, maleated polyethylene containing 0.25–2.0 wt % maleic anhydride monomer units is available commercially. The maleated polyethylene can be converted to the p-maleimidobenzoic acid derivative by heating/mixing, preferably by extrusion, with 0.5–3 wt %, preferably about 1–2 wt % PABA in an extruder at a temperature of about 150°–200° C., preferably about 175° C. This reaction converts the maleic anhydride units to p-maleimido benzoic acid units having the formula shown below.

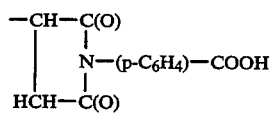

About 25 wt % to 100 wt %, preferably 25-75 wt %, of the EAA may be replaced with a copolymerizable anhydride or carboxylic acid-containing polymer. For example, when a portion of the EAA is replaced with derivatized HPDE, modulus values of the blend are improved. When a portion of EAA is replaced with derivatized EPDM, the resulting blend has improved impact strength. Preferably, the polymers used to replace a portion of the EAA have a molecular weight of at least 20,000, preferably about 100,000-1,000,000.

The thermoplastic resins of the present invention provide perfectly compatible blends of PPE with EAA which display excellent solvent resistance together with a satisfactory stiffness, an excellent processability and impact properties.

The thermoplastic polymer blends of the present invention may be compounded with about 5-25% by wt of other resins such as PPE, PE, EAA or styrene resins. In addition to the above-described components, various additives may be also compounded provided that they do not impair the effects of the present invention, primarily the excellent compatibility of the components. The most important additives include stabilizers, antioxidants, releasing agents, plasticizers, flame-retarders, fillers, antistatics and colorants.

Compounding of the polymer blend with additional additives for preparing the blends of the present invention is preferentially performed after the reactive melt mixing of polymers (A) and (B) with the anhydride (C). The additives may be added in one step or in two or more steps with repeated compounding as necessary.

For example, a first addition of antioxidant may be conducted during the first step, i.e., during the reactive melt mixing of (A), (B) and (C) to give the copolymer blend of the present invention. A second addition of components, e.g. releasing-agents and plasticizers, may be conducted after the reactive melt mixing. During this second addition step, other suitable resins may be added as well.

The compounding can be carried out be various methods generally employed for blending resins with compounding agents, such as stabilizers and antioxidants. For example the components in the form of powders, granules or in a mixed form, i.e. powder plus pellets, are uniformly dispersed in a mixer, (HENSCHEL mixer, HAAKE BUCHLER mixer, twin cylinder mixer, ribbon blender, etc.) provided that there is sufficient residence time for the reactive melt blending to occur and the mixture is then melt-kneaded by means of a kneader, e.g., a roll mill, a BANBURY mixer, a BRABENDER PLASTOGRAPH etc. The thus obtained resin composition may be extruded into pellets.

The resin composition of the present invention can be easily molded by molding processes commonly applied to thermoplastic resins, i.e. injection molding, extrusion molding, etc. Injection molding is particularly preferred.

Other features of the invention will become apparent in the course of the following descriptions of exemplary embodiments which are given for illustration of the invention and are not intended to be limiting thereof.

EXAMPLES

Example 1-50 wt % PPE/50 wt % EAA blends made with benzoic anhydride on the HAAKE mixer Moisture free reagents were used for the experiments. The PPE was dried at 110° C. for four hours. EAA was dried in a vacuum oven at 70° C. overnight (about 16 hours).

Poly(2,6-dimethyl-1,4-phenylene) ether (PPE) from Scientific Polymer Products, Inc. (SP2), 22 g (50 wt. %) and 22 g (50 wt %) of ethylene acrylic acid copolymer (EAA), PRIMACOR 1430 pellets (9.5% acrylic acid, AA) from Dow Chemical were mixed with benzoic anhydride and about 0.25 wt. % IRGANOX 1076 antioxidant. The mixture was charged to a HAAKE BUCHLER mixer (capacity 6.9 cc) with roller blades, which was preheated to 270° C. The screw speed was set at 100 rpm. Microcomputer provisions on this equipment permit the control of mixing variables. Torque and temperature were monitored as a function of time.

The amounts of benzoic anhydride, magnesium acetate tetrahydrate (catalyst), mixing times, initial and final torque readings and final melt temperatures are shown for each run in Table 1.

At the end of the running time, the melted material was removed from the chamber and from the screws. After cooling, the material was pulverized or allowed to remain as chunks. The powder or chunks of the blend was used to press films on a CARVER press at temperatures of from 250°-275° C. Thick films (0.1-1 mm) were used to obtain scanning electron microscope (SEM) photomicrographs and thin films (0.1 mm) to determine Fourier Transform (FT) IR spectra. In cases where the PPE was removed from the blend by chloroform extraction, a film for FTIR determination was cast from the chloroform solution.

Example 2 - Reaction of EAA with/without benzoic anhydride in the HAAKE mixer A charge of 44 g of moisture-free EAA pellets, IRGANOX 1076 with or without benzoic anhydride was introduced into the HAAKE mixer at the desired preset temperature. The screw speed was set at 100 rpm. The quantities of benzoic anhydride, Mg $(OAc)_2 \cdot 5H_2O$, mixing times, set temperatures, final melt temperatures and initial and final torque measurements are shown in Table 2. The FTIR spectra were taken on pressed films of the products as described above.

Example 3 - LEISTRITZ extrusion (melt mixinq) of PPE/EAA blends

The polymers PPE and EAA were dried at 60° C. for 22 hours in a vacuum oven. Alternatively PPE was dried separately at 110° C. for four hours and PRIMACOR EAA and maleated high density polyethylene (POLYBOND 3009, MW =186,000) materials were dried 24 hours in a vacuum oven at 60°-70° C. overnight.

The extruder was a LEISTRITZ LSM 30.34 laboratory twin extruder equipped with a LEISTRITZ LSD1 hopper feeder and vacuum capability (800 mbars). The output ran from 2.5-3.0 kg/hour (5.5-6.6 pounds/hour). The ⅛ inch two-hole die was heated to the same temperature as the barrels. The strands were passed through a water bath and the excess water blown off before entering a CUMBERLAND UTILIZER pelletizer with rotary blades. The pelletized PPE blends were dried in forced air ovens at about 110° C. The polyethylene was dried in a vacuum at 60°-70° C. overnight.

Example 3a - Reaction of PRIMACOR 1430 EAA/PPE with benzoic anhydride in the LEISTRITZ extruder The extrusion conditions and the molding conditions are summarized in Tables 3 and 10. The properties are reported in Tables 4–5. The residence time of the polymers in the LEISTRITZ twin extruder is about 1–2 minutes. Samples run on the twin screw extruder with benzoic anhydride (Samples 71-38, 71-91-15 and 71-103-4) are superior to the melt-mixed control samples prepared in the twin screw extruder without the anhydride (Samples 71-35 and 71-54) and also exhibit better mechanical properties than thermally melt-mixed samples prepared in the HAAKE mixer (Samples 71-29 and 71-57).

Example 4 - Preparation of the p-maleimidobenzoic acid derivative of maleated HDPE/POLYBOND 3009)

1% p-aminobenzoic acid (sample 71-55E):

HDPE (2500 g) was dried in a vacuum oven at 60° C. overnight. The dried HDPE was tumbled with 25 g p-aminobenzoic acid (1 wt %) and 6.25 g (0.25 wt %) of IRGANOX 1076 antioxidant. The blend was fed into the LEISTRITZ extruder at a feed of 12 rpm which gave an output of 3.45 kg/hr (7.6 pounds/hour) at a screw speed of 70 rpm. The barrel temperatures were set at 175° C. and the die at 177° C. and the extruder was provided with vacuum in the decompression zone. After stranding the extrudate through a water bath, the material was pelletized and the pellets dried in a vacuum at 60° C. overnight.

A film was pressed out of the pellets and the FTIR curve determined. The FTIR showed bands at 1719 $cm^{-1}$ and at 1780 $cm^{-1}$, which are characteristic of the maleimide carbonyl bands. The maleated anhydride carbonyl band of the starting material (maleated HDPE) at 1790 $cm^{-1}$ was greatly reduced but still present. Also present in the product were the C-O bends of the COOH group at 1176 $cm^{-1}$. The acid carbonyl band appeared as a shoulder at 1695 $cm^{-1}$.

2% p-aminobenzoic acid (sample 71-74-1):

The run described above was repeated using 44 g (2 wt %) p-aminobenzoic acid (PABA). The product was slightly darker than the product in which only 1 wt % PABA was used. FTIR on the pressed film revealed that the maleated carbonyl band at 1790 $cm^{-1}$ was reduced further and the band at 1780 $cm^{-1}$ much stronger relative to the 1790 $cm^{-1}$. The intensity of the C-O band at 1176 $cm^{-1}$ was about 20% stronger in sample 71-74-1 than sample 71-55E.

Example 5 - POLYBOND/EAA blends

Extrusion conditions:

Sample 71-91-3. A mixture of 1000 g of POLYBOND 3009, and 1000 g of PRIMACOR 1430 EAA was tumbled together and fed to the LEISTRITZ extruder at a feed rate of 10 rpm. The barrel temperatures were set at 270° C. The extrudate was stranded, passed through a water bath and pelletized. No vacuum was used in this extrusion.

Sample 71-91-4. The charge and conditions were essentially the same as Sample 71-91-3 above, except that 44 g (2 wt. %) of benzoic anhydride was added to the charge and the extrusion was run with vacuum.

Sample 71-91-5. The charge and conditions were the same as in Sample 71-91-4 above except that the POLYBOND 3009 was replaced with the p-aminobenzoic acid derivative of POLYBOND (Sample 071-55E).

Molding Conditions: The pellets from the above extrusions were dried in vacuum at 60° C. overnight.

Results and molding conditions for compositions containing POLYBOND or its p-maleimidobenzoic acid derivative are shown in Tables 6-10.

As seen in Table 6, compositions in which 50% of the EAA is substituted with maleated polyethylene (Sample 71-69-4) or its p-maleimidobenzoic acid derivative (Sample 71-69-3) produced compositions having a high flexural modulus and adequate toughness relative to the composition without maleated polyethylene (Sample 71-38). Samples 71-69-4 and 71-69-3 shows substantially better mechanical properties than the control (Sample 71-35) made from PPE/EAA (50 wt. %/50 wt. %) without anhydride.

Table 7 shows that the substitution of EAA with maleated polyethylene without anhydride produces a product which has a high modulus (Sample 71-54 vs. Sample 71-91-10). The addition of 1 wt. % benzoic anhydride improves the mechanical properties (Sample 71-74-2 vs. Sample 71-91-10). Substitution of the maleated polyethylene with its p-maleimidobenzoic acid derivative (Sample 71-74-4) also provides a product having good mechanical properties. Some improvement in tensile properties can be obtained by replacing half of the maleated polyethylene with EAA (Sample 71-74-3). Further improvements are obtained when the maleated polyethylene (Sample 71-74-3) is replaced with its p-maleimidobenzoic acid derivative (Sample 71-74-5). The use of 2 wt. % benzoic anhydride generally produces a favorable increase in physical properties (Samples 71-91-15, 71-108-5, 71-103-3 and 71-74-8) relative to compositions prepared with 1 wt. % benzoic anhydride.

Example 6 (comparative) - 50% PPE/50% ethylene/10% acrylic acid copolymer (obtained from SP2; Sample 71-106-1)

22 g of PPE, 22 g of EAA (with 10% AA) and 0.44 g (1 wt. %) benzoic anhydride was kneaded in the HAAKE mixer at 270° C. for 6.5 minutes. The torque was very low and close to zero because the melt viscosity of the EAA appeared to be very low and the compound could not mix well.

The EAA was pressed into a film at 100° C. for FTIR and DSC measurements. The FTIR had bands at the same location as PRIMACOR 1430, but had higher and sharper absorption in some areas. The melting point determined by DSC was 89° C. compared to 97° C. measured on PRIMACOR 1430.

Example 7 - 50% PPE/50% propylene 10% acrylic acid copolymer 22 g of PPE, 22 g of propylene/acrylic acid (10 wt. %) copolymer, M.W. =100,000, 0.88 g (2 wt. %) of benzoic anhydride and 0.11g (0.25%) of IRGANOX 1076 antioxident are kneaded in a HAAKE mixer at 270° C for 9 minutes. After cooling, the resulting material is pulverized. The blend exhibits better mechanical properties than thermally melt-mixed samples.

Example 8-50% PPE/50% polymethacrylic acid

Control (Sample 71-110-2). 22 g of PPE and 22 g of polymethylacrylic acid, M.W.=150,000, were kneaded in the HAAKE at 270° C. for 9 minutes.

Sample 71-110. The charge was the same as in Sample 71-110-2, except that 0.44 g (1 wt %) benzoic anhydride was added to the charge. Films were pressed of both two hours, the mixture was allowed to cool to room temperature overnight. The mixture was added to ice water and the solid material filtered by suction, washed with water and dried. The FTIR showed bands at 1717 $cm^{-1}$ and at 1176 $cm^{-1}$, which identified it as the maleimidobenzoic acid derivative (Sample 71-11); the yield was 28.14%. A DSC run on the product showed no Tg up to the melting point (starting at 112° C.).

TABLE 1

PPE/EAA(50/50) blending experiments in small Haake Mixer set temperature: 270° C.

| ID | Mg(OAc)2 (%) | Bz. anhydride (%) | mixing time (min) | final temp. (°C.) | initial Tor. (mg) | final Tor. (mg) | $(Tor_{max}-Tor_{min})/Tor_{min}$ |
|---|---|---|---|---|---|---|---|
| 0071-22 | 0 | 0 | 9 | 278 | 358 | 508 | 0.42 |
| 0071-22 | 0 | 0 | 21 | 293 | 358 | 1350 | 2.86 |
| 0071-41 | 0.34 | 0 | 9 | 289 | 369 | 670 | 0.82 |
| 0071-34 | 0.34 | 2.5 | 9 | 305 | 1700 | 1315 | |
| 0071-34B | 0.34 | 2.5 | 9 | 312 | 1900 | 1399 | |
| 0071-37 | 0 | 2.5 | 4.5 | 310 | | 3200 | |
| 0071-45 | 0.34 | 1.0 | 9 | 290 | 450 | 750 | |
| 0071-43 | 0 | 1.0 | 9 | 302 | 1300 | 1444 | |

TABLE 2

EAA heated in Haake Mixer

| product ID | benzoic anhydride %/ Mg(OAc)₂% | mixing time (minute) | set temp. (°C.) | final temp. (°C.) | initial Tor. (mg) | final Tor. (mg) | $(Tor_{max}-Tor_{min})/Tor_{min}$ |
|---|---|---|---|---|---|---|---|
| 71-26 | 0/0 | 21 | 270 | 285 | 225 | 550 | 1.44 |
| 71-36 | 2.5/0.34 | 9 | 270 | 300 | 1060 | 1247 | 0.18 |
| 71-73-1 | 0/0 | 17 | 290 | 301 | — | | |
| 71-73-2 | 2.0/0 | 17 | 295 | 308 | — | | |
| 71-73-3 | 2.0/0 | 17 | 175 | 185 | | solidified | |

TABLE 3

Molding Conditions for the Blends in Table 4

| Sample ID | 71-35 | 71-29 | 71-38 | 71-54 | 71-57 | 71-91-15 | 71-103-4 |
|---|---|---|---|---|---|---|---|
| Barrel Temp.(°F.) | 550 | 550 | 580 | 570 | 575 | 580 | 570 |
| Inj. Pressure(psi) | 900 | 1300 | 1800 | 1900 | 2100 | 2250 | 2150 |
| Hold Pressure(psi) | 550 | 800 | 1000 | 700 | 650 | 700 | 1100 |
| Screw Feed Stroke(in) | 2.80 | 2.80 | 2.90 | 3.0 | 3.0 | 2.8 | 2.8 |
| Inj. Speed(in/s) | 2.2/2.0/2.6 | 2.2/2.0/2.6 | 2.8/2.4/2.6 | 2.5/2.3/2.4 | 2.5/2.3/2.4 | 3.2/2.8/3.0 | 3.4/3.1/3.2 |
| Mold Temp.(°F.) | 100 | 125 | 150 | 200 | 200 | 200 | 240 | runs at 300° C.

Example 9 - Polyolefin/Acid Copolymers from p-aminobenzoic acid and polyolefin/maleic anhydride copolymers Into a 500 ml round bottom flask was added 20 g (146 mmole) p-aminobenzoic acid, 18,3 g (146 mmole) ethylene/maleic anhydride copolymer (50 wt. %) and 100 ml glacial acetic acid and the mixture stirred near the boiling point of acetic acid at 116°-118° C. After

TABLE 4

Physical Properties of PPE/E.AA Blends

| Sample ID | | EAA | 71-35-3 | 71-29 | 71-38 | 71-54 | 71-57 | 71-91-15 | 71-103-4[2] | PPE |
|---|---|---|---|---|---|---|---|---|---|---|
| Mixer | | | Leistritz | Haake | Leistritz | Leistritz | Haake | Leistritz | Leistritz | |
| Composition | PPE(SP²)(%) | | 50 | 50 | 50 | 70 | 70 | 70 | 70 | |
| | Primacor1430(%) | | 50 | 50 | 50 | 30 | 30 | 30 | 30 | |
| | Benz. Anhydride(%) | | | | 2.5 | | | 2 | 2 | |
| | Mg(OAc)₂(%) | | | | 0.34 | | | | | |
| Properties | tensile strength (psi) | 1,837 | 1,837 | 3.274 | 3,900 | 4,327 | 4,956 | 6,100 | 6,100 | 11,600 |
| | tensile elongation (%) | 388 | 18 | 61 | 32 | 13 | 15 | 16 | 15 | 8 |
| | flexural strength (psi) | 834 | 2,728 | 3,523 | 4,500 | 5,368 | 6,895 | 7,600 | 7,400 | 16,500 |
| | flexural modulus (psi) | 15,547 | 76,723 | 77,737 | 105,000 | 148,588 | 171,408 | 155,000 | 160,000 | 390000 |
| | notched izod (ft.lbs) | 6.5 | 0.93 | 2.4 | 1.2 | 0.48 | 0.69 | 1.0 | 0.98 | 1.0 |
| Chemical Resistance[1] | tensile strength (psi) | | 1,821 | 3,237 | 3,800 | 4,347 | 4,852 | 6,300 | | cracked |
| | tensile elongation (%) | | 17 | 64 | 32 | 14 | 15 | 16 | | cracked |

[1]The physical properties of chemical resistance were evaluated after tensile bars were immersed in a mixture of toluene/isoctane(50/50) under 0.7% strain for 10 seconds and then dried.
[2]Duplicate run

TABLE 5

Physical Properties of Extruded PPE/EAA Blends

| property | EAA | EAA 71-56 (w/2% DZA.) | PPE/EAA (50/50) 71-38 | PPE/EAA (50/50) 71-35 (w/2.5% DZA A cal.) |
|---|---|---|---|---|
| tensile strength (psi) | 1,837 | 1,680 | 1,837 | 3,888 |
| tensile elongation (%) | 388 | 190 | 18 | 32 |
| flexural strength (psi) | 834 | 898 | 2,728 | 4,539 |
| flexural modulus (psi) | 15,547 | 15,756 | 76,723 | 105,703 |
| notched izod (ft.lbs) | 6.5 | 6.3 | 0.93 | 1.22 |
| Chemical Resistance | | | | |
| tensile strength (psi) | | | 1,821 | 3,811 |
| tensile elongation (%) | | | 17 | 32 |

TABLE 6

Physical Properties of Injection Molded PPE/(EAA + Polybond)(50/50) Blends

| Sample ID | | EAA | 0071-35 | 0071-38 | 0071-69-4 | 0071-69-3 | PPE |
|---|---|---|---|---|---|---|---|
| Composition | PPE(SP²)(%) | | 50 | 50 | 50 | 50 | |
| | Primacor 1430(%) | 100 | 50 | 50 | 25 | 25 | |
| | Polybond 3009(%) | | | | 25 | | |
| | 0071-55E[1] | | | | | 25 | |
| | benz. anhydride (%) | | | 2.5 | 2 | 2 | |
| | Mg(OAc)$_2$ 4H$_2$O(%) | | | 0.34 | | | |
| Properties | tensile strength (psi) | 1,837 | 1,837 | 3,888 | 2,763 | 2,665 | 11,600 |
| | tensile elongation (%) | 388 | 18 | 32 | 12 | 12 | 8 |
| | flexural strength (psi) | 834 | 2,728 | 4,539 | 3,909 | 3,570 | 16,500 |
| | flexural modulus (psi) | 15,547 | 76,723 | 105,703 | 110,336 | 103,409 | 390,000 |
| | toughness (in#/in³) | 7.7 | 18.9 | 29.8 | 25.4 | 24.4 | |
| | notched izod (ft.lbs) | 6.5 | 0.93 | 1.2 | | | 1.0 |
| Chemical[2] Resistance | tensile strength (psi) | | 1,821 | 3,811 | 2,764 | 2,690 | cracked |
| | tensile elongation (%) | | 17 | 32 | 11 | 13 | cracked |

[1]Polybond 3009 reacted with 1% p-aminobenzoic acid
[2]The physical properties of chemical resistance were evaluated after tensile bars were immersed in a mixture of toluene/isoctane(50/50) under 0.7% strain for 10 seconds and then dried

TABLE 7

Physical Properties of Injection Molded PPE/(IEAA + Polybond)(70/30)) Blends

| Sample ID | | 0071-54 | 71-91-15 | 71-91-10 | 71-74-2 | 71-108-5 | 71-74-4 | 71-103-2 | 71-74-3 | 71-103-3 | 71-74-5 | 71-74-8 |
|---|---|---|---|---|---|---|---|---|---|---|---|---|
| Composition | PPE(SP²)(%) | 70 | 70 | 70 | 70 | 70 | 70 | 70 | 70 | 70 | 70 | 70 |
| | Primacor 1430 (%) | 30 | 30 | | | | | 15 | 15 | 15 | 15 | 15 |
| | Polybond 3009 (%) | | | 30 | 30 | 30 | | 15 | 15 | 15 | | |
| | 0071-74-1[1] | | | | | | 30 | | | | 15 | 15 |
| | benz. anhydride (%) | | 2 | | 1 | 2 | 1 | | 1 | 2 | 1 | 2 |
| Properties | tensile strength (psi) | 4,300 | 6,100 | 4,400 | 4,996 | 4,200 | 4,600 | 4,600 | 5,500 | 5,100 | 5,500 | 6,000 |
| | tensile elongation (%) | 13 | 15.6 | 8.9 | 8.0 | 6.6 | 8.0 | 9.6 | 10 | 9.6 | 12 | 13 |
| | flexural strength (psi) | 5,400 | 7,600 | 6,500 | 7,085 | 5,600 | 6,400 | 5,700 | 6,000 | 6,200 | 6,800 | 8,300 |
| | flexural modulus (psi) | 149,000 | 155,000 | 194,000 | 214,000 | 195,000 | 199,000 | 176,000 | 179,000 | 187,000 | 174,000 | 202,000 |
| | notched izod (ft.lbs) | 0.48 | 1.0 | 0.55 | 0.81 | 0.51 | 0.59 | 0.46 | 0.64 | 0.76 | 0.73 | 0.98 |
| Chemical Resistance[2] | tensile strength (psi) | 4,300 | 6,300 | 4,500 | 5,000 | | 4,600 | | 4,900 | | 5,000 | 6,000 |
| | tensile elongation (%) | 14 | 16.0 | 9.6 | 9 | | 9 | | 10 | | 12 | 14 |

[1]Polybond 3009 reacted with 2% Paminobenzoic acid
[2]The physical properties of chemical resistance were evaluated after tensile bars were immersed in a mixture of toluene/isoctane(50/50) under 0.7% strain for 10 seconds and then dried.

TABLE 8

Physical Properties of Injection, Molded EAA/Polybond Blends

| Sample ID | | EAA | 71-91-3 | 71-91-4 | 71-91-5 |
|---|---|---|---|---|---|
| Composition | Primacor 1430 (%) | 100 | 50 | 50 | 50 |
| | Polybond 3009 (%) (71-55E)[1] | | 50 | 50 | |
| | | | | | 50 |
| | benz. anhydride (%) | | | 2 | 2 |
| Properties | tensile strength (psi) | 1,837 | 2,100 | 2,200 | 2,100 |
| | tensile elongation (%) | 388 | 329 | 144 | 148 |
| | flexural strength (psi) | 834 | 1,800 | 1,800 | 1,700 |
| | flexural modulus (psi) | 15,547 | 44,000 | 37,000 | 43,000 |
| | notched izod (ft.lbs) | 6.5 | 13.3 | 9.3 | 8.5 |

[1]Polybond 3009 reacted with 2% p-aminobenzoic acid in Leistritz at 175° C.

TABLE 9

MOLDING CONDITIONS FOR EAA/POLYBOND (50/50) BLENDS

| Sample | Composition | Barrel Temp. (°F.) | Inj. Pressure (psi) | Hold Pressure (psi) | Feed Stroke (in) | Inj. Speed (in/s) | Mold Temp. (°F.) |
|---|---|---|---|---|---|---|---|
| 71-91-3 | EAA 50% PB 50% | 360 | 1600 | 700 | 2.65 | 2.8/2.4/2.6 | 75 |
| 71-91-4 | EAA 50% PB 50% with 2% Ben. Anhydride | 360 | 1500 | 508 | 2.90 | 3.2/2.8/3.0 | 75 |
| 71-91-5 | EAA 50% P-Amino-Benzoic acid Treated PB 50% with 2% Ben.Anhydride | 360 | 1200 | 653 | 2.90 | 3.2/2.8/3.0 | 75 |

TABLE 10

Extrusion and Molding Conditions of PPE/(EAA + PB)(70/30) Blends in Table 7

| Run No | | 71-54 | 71-91-15 | 71-91-10 | 71-74-2 | 71-108-5 | 71-74-4 | 71-103-2 | 71-74-3 | 71-103-3 | 71-74-5 | 71-74-8 |
|---|---|---|---|---|---|---|---|---|---|---|---|---|
| Extrusion Conditions | Charge (g) | 2,500 | 1,600 | 1,600 | 2,000 | 1,600 | 1,500 | 1,600 | 2,000 | 1,600 | 1,500 | 1,500 |
| | Zone Temp. (°C.) | 270 | 295 | 280 | 295 | 295 | 295 | 295 | 295 | 295 | 295 | 295 |
| | Die Temp. (°C.) | 264 | 297 | 280 | 286 | 292 | 289 | 289 | 289 | 290 | 289 | 289 |
| | Feed Rate (rpm) | 10 | 6 | 5 | 10 | 10 | 10 | 10 | 10 | 10 | 10 | 10 |
| | Screw Speed (rpm) | 60 | 60 | 100 | 60 | 100 | 60 | 60 | 60 | 60 | 60 | 60 |
| Molding Conditions | Barrel Temp. (°F.) | 570 | 580 | 550 | 560 | 560 | 560 | 570 | 570 | 570 | 560 | 560 |
| | Inj. Pressure (psi) | 1,900 | 2,250 | 2,200 | 2,050 | 1950 | 2,050 | 1750 | 2050 | 2,000 | 2,050 | 2,050 |
| | Hold Pressure (psi) | 700 | 700 | 700 | 500 | 550 | 500 | 450 | 500 | 1,100 | 500 | 350 |
| | Screw Feed Stroke (in) | 2.90 | 2.80 | 2.80 | 3.0 | 2.85 | 3.0 | 2.8 | 3.0 | 2.8 | 3.0 | 2.80 |
| | Inj. Speed (in/s) | 2.5/2.3/2.4 | 3.8/3.4/3.5 | 3.4/3.0/3.2 | 2.4/2.4/2.3 | 3.0/2.7/2.8 | 2.4/2.4/2.3 | 3.2/3.9/3.1 | 2.4/2.4/2.3 | 3.2/2.9/3.1 | 2.4/2.4/2.3 | 2.4/2.6/3.2 |
| | Mold Temp. (°F.) | 200 | 200 | 150 | 175 | 160 | 175 | 240 | 175 | 240 | 175 | 175 |

TABLE 11

Extrusion and Molding Conditions of Extruded Blends in Table 5

| Run No | | EAA | 71-56 | 71-38 | 71-35 |
|---|---|---|---|---|---|
| Extrusion Conditions | Charge (g) | | 2,500 | 2,000 | 1,600 |
| | Zone Temp. (°C.) | | 260 | 270 | 270 |
| | Die Temp. (°C.) | | 234 | 278 | 275 |
| | Feed Rate (rpm) | | 6 | 10 | 20 |
| | Screw Speed (rpm) | | 64 | 100 | 100 |
| Molding Conditions | Barrel Temp. (°F.) | 360 | 380 | 560 | 560 |
| | Inj. Pressure (psi) | 800 | 1,300 | 1,800 | 900 |
| | Hold Pressure (psi) | 640 | 850 | 1,000 | 550 |
| | Screw Feed Stroke (in) | 3.0 | 3.0 | 3.1 | 2.8 |
| | Inj. Speed (in/s) | 3.2/2.8/3.4 | 3.2/2.8/3.4 | 1.5/1.0/1.3 | 2.2/2.0/2.6 |
| | Mold Temp. (°F.) | 70 | 70 | 150 | 150 |

What is claimed is:

1. A process for preparing a compatible polymer blend, comprising reactive melt mixing a mixture consisting essentially of
   A) 40 to 80% by weight polyphenylene ether,
   B) 20 to 60% by weight of a $C_{2-4}$ olefin-(alkyl)acrylic acid random copolymer containing from 4 to 15 wt. % acrylic acid monomer units, and
   C) 0.1–3.0wt.%, based on the sum of (A) and (B), of a carboxylic anhydride.

2. The process of claim 1, comprising reactive melt mixing 50–70% by weight of said polyphenylene ether, and 30–50% by weight of said olefin-(alkyl)acrylic acid random copolymer.

3. The process of claim 1, wherein said reactive melt mixing is conducted for a period of time ranging from 0.5 to 2 minutes.

4. The process of claim 1, wherein said reactive melt mixing is conducted in an extruder.

5. The process of claim 1, comprising reactive melt mixing said polymers (A) and (B) and 1-2.5 wt. % of said carboxylic anhydride (C).

6. The process of claim 1, wherein said carboxylic anhydride is a $C_{9-20}$ aromatic, $C_{4-20}$ aliphatic or mixed aromatic/aliphatic anhydride.

7. The process of claim 1, wherein the polymer formed by said reactive melt mixing consists of polyphenylene ether covalently bonded to said olefin-(alkyl)acrylic acid random copolymer through ester bonds.

8. The process of claim 1, wherein said reactive melt mixing is conducted in the presence of an esterification catalyst.

9. The process of claim 1, comprising reactive melt mixing said polyphenylene ether with said olefin-(alkyl)acrylic acid random copolymer and benzoic anhydride.

10. The process of claim 1, comprising reactive melt mixing said polyphenylene ether with an ethylene-acrylic acid random copolymer and benzoic anhydride.

11. The process of claim 1, wherein said olefin-(alkyl)acrylic acid random copolymer is an ethylene-acrylic acid random copolymer.

12. The process of claim 1, wherein said olefin-(alkyl)acrylic acid random copolymer is an ethylene-(meth)acrylic acid random copolymer.

13. The process of claim 1, wherein said polyphenylene ether is dispersed as droplets having an average particle size of about 0.1–2 microns in diameter in said olefin-(alkyl)acrylic acid random copolymer.

14. The process of claim 13, wherein said polyphenylene ether is dispersed as droplets having an average particle size of about 0.5–1 microns in said olefin-(alkyl)acrylic acid random copolymer.

15. The process of claim 1, wherein said polyphenylene ether is poly (2,6-dimethyl-1,4-phenylene ether).

16. A polymer blend obtained by the process of claim 1.

* * * * *